(12) United States Patent
Grinfeld

(10) Patent No.: US 7,035,291 B2
(45) Date of Patent: Apr. 25, 2006

(54) TCP TRANSMISSION ACCELERATION

(76) Inventor: Ron Grinfeld, 3 Maale Hazvi Street, Ramat Gan (IL)

( * ) Notice: Subject to any disclaimer, the term of this patent is extended or adjusted under 35 U.S.C. 154(b) by 925 days.

(21) Appl. No.: 10/094,009

(22) Filed: Mar. 7, 2002

(65) Prior Publication Data

US 2002/0163888 A1    Nov. 7, 2002

Related U.S. Application Data

(60) Provisional application No. 60/288,288, filed on May 2, 2001.

(51) Int. Cl.
*H04J 3/06*    (2006.01)
(52) U.S. Cl. ...................... 370/503; 370/389
(58) Field of Classification Search ............... 370/304, 370/324, 350, 503, 507, 509, 510, 511–514, 370/395.62, 514.52
See application file for complete search history.

(56) References Cited

U.S. PATENT DOCUMENTS

| | | |
|---|---|---|
| 5,493,667 A | 2/1996 | Huck et al. |
| 5,809,527 A | 9/1998 | Cooper et al. |
| 5,809,543 A | 9/1998 | Byers et al. |
| 5,963,963 A | 10/1999 | Schmuck et al. |
| 6,173,333 B1 * | 1/2001 | Jolitz et al. ............. 709/240 |
| 6,438,655 B1 | 8/2002 | Nicol et al. |
| 6,601,143 B1 | 7/2003 | Lamparter |
| 6,771,646 B1 | 8/2004 | Sarkissian et al. |
| 6,941,327 B1 * | 9/2005 | Kim et al. ................. 707/204 |
| 2004/0111523 A1 * | 6/2004 | Hall et al. ................. 709/230 |

OTHER PUBLICATIONS

Postel (ed.), RFC 793 of the U.S. Defense Advanced Research Projects Agency (DARPA), entitled: "Transmission Control Protocol: DARPA Internet Program Protocol Specification", Sep. 1981.
Clark, DARPA RFC 813, "Window and Acknowledgement Strategy in TCP", Jul. 1982.
Allman et al., RFC 2581 of the Internet Engineering Task Force (IETF) Network Working Group, entitled: "TCP Congestion Control", Apr. 1999.
V. Jacobson et al., "Congestion Avoidance and Control", Nov. 1988.

\* cited by examiner

*Primary Examiner*—Brenda Pham

(57) ABSTRACT

A data transceiver includes a transmitter, which generates datagrams for transmission to a peer over a network in accordance with a reliable transport protocol, so as to transmit the datagrams substantially continuously from a starting datagram through a final datagram in a current transmission window. A receiver is coupled to receive acknowledgments from the peer of the datagrams that have reached the peer over the network. A synchronization interface receives the acknowledgments from the receiver and, responsive thereto, redetermines the starting datagram and informs the transmitter of the redetermined starting datagram, causing the transmitter to redetermine the final datagram in the current transmission window substantially without interrupting the transmission of the datagrams.

34 Claims, 5 Drawing Sheets

TCP TRANSMISSION ACCELERATION

CROSS-REFERENCE TO RELATED APPLICATION

This application claims the benefit of U.S. Provisional Patent Application No. 60/288,288, filed May 2, 2001, which is incorporated herein by reference.

FIELD OF THE INVENTION

The present invention relates generally to methods and devices for network communications, and specifically to streamlining operation of reliable communication transport protocols.

BACKGROUND OF THE INVENTION

The Transmission Control Protocol/Internet Protocol (TCP/IP) suite is the most widely-used transport protocol in digital packet networks today. TCP is a connection-oriented, end-to-end, full-duplex protocol, which provides for reliable inter-process communication between pairs of processes in host computers. The information exchanged between TCP peers is packed into datagrams known as segments, each comprising a TCP header followed by payload data. The segments are transported over the network in IP packets. TCP is described by Postel in RFC 793 of the U.S. Defense Advanced Research Projects Agency (DARPA), entitled "Transmission Control Protocol: DARPA Internet Program Protocol Specification" (1981), which is incorporated herein by reference.

The key elements used by TCP for maintaining efficient, reliable communications are its acknowledgment and window mechanisms. These mechanisms are described in detail in RFC 793 and are further analyzed and optimized by Clark in DARPA RFC 813, entitled "Window and Acknowledgement Strategy in TCP" (1982), which is also incorporated herein by reference. As explained by Clark, when data arrives at the recipient, TCP requires that the recipient send back an acknowledgment (ACK) of the data. When the sender does not receive the ACK within a certain period of time, it retransmits the data. TCP specifies that the bytes of data are sequentially numbered, so that the recipient can acknowledge data by naming the highest numbered byte of data it has received, which also acknowledges the previous bytes. RFC 793 contains only a general assertion that data should be acknowledged promptly, but gives no more specific indication as to how quickly an acknowledgement must be sent, or how much data should be acknowledged in each separate acknowledgement.

The window mechanism is a flow control tool. Whenever appropriate, the recipient of data returns to the sender a number, which is (more or less) the size of the buffer that the receiver currently has available for additional data. This number of bytes, called the window, is the maximum that the sender is permitted to transmit until the receiver returns some additional window. Sometimes the receiver will have no buffer space available and will return a window value of zero. Under these circumstances, the protocol requires the sender to send a small segment to the receiver now and then, to see if more data can be accepted. Again, RFC 793 does not specify under what circumstances the window should be increased, or how the sender should respond to such revised information.

A number of authors have suggested strategies for enhancing the efficiency of TCP-based communications. Among these authors is Clark, who in the above-mentioned RFC 813 identifies a degeneration of communication throughput that can occur during long TCP data transfers. He calls this phenomenon the Silly Window Syndrome (SWS) and offers a number of algorithms that can be used to overcome it. For example, the sender of the data can compare the size of the window offered by the receiver to the size of its own usable window, which is the offered window minus the amount of outstanding, unacknowledged data that the sender has transmitted. The usable window in conventional TCP implementations is always smaller than the offered window. If the ratio of the usable window to the offered window size drops below a given fraction, the sender can conclude that SWS has occurred. Under these conditions, the sender should stop transmitting until the usable window size has increased.

Allman et al. describe methods for improving TCP performance under conditions of network congestion in RFC 2581 of the Internet Engineering Task Force (IETF) Network Working Group, entitled "TCP Congestion Control" (April, 1999), which is incorporated herein by reference. These methods include slow start and congestion avoidance algorithms, which are used by a TCP sender to control the amount of outstanding data being injected into the network, and fast retransmit/fast recovery algorithms, used to detect and repair segments lost in transmission.

To implement the slow start and congestion avoidance algorithms, a number of variables are added to the TCP per-connection state. The congestion window (cwnd) is a sender-side limit on the amount of data the sender can transmit into the network before receiving an acknowledgment (ACK), while the receiver's advertised window (rwnd) is a receiver-side limit on the amount of outstanding data. The minimum of cwnd and rwnd determines the amount of data that the sender can transmit at any given time. Another state variable, the slow start threshold (ssthresh), is used to determine whether the slow start or congestion avoidance algorithm is used to control data transmission, as described below.

The slow start algorithm is used to slowly probe the network to determine the available capacity at the beginning of a transfer, or after repairing loss detected when an ACK is not received within the required timeout period. The value of cwnd is set to a small initial window (IW) value, and is then gradually incremented each time an ACK is received. When cwnd increases above ssthresh, the sender switches over to the congestion avoidance algorithm, whereby cwnd is incremented by a full segment per round-trip time (RTT) of the connection. As an approximation to this criterion, cwnd is typically incremented on each incoming, non-duplicate ACK by an amount given by SMSS*SMSS/cwnd, rounded up to the nearest byte, wherein SMSS (sender maximum segment size) is the size of the largest segment that the sender can transmit.

The fast retransmit/fast recovery algorithm specifies that a TCP receiver should send an immediate duplicate ACK when an out-of-order segment arrives. The purpose of this ACK is to inform the sender that a segment was received out-of-order and which sequence number was expected. Three duplicate ACKs (four identical ACKs without the arrival of any other intervening packets) are treated by the sender as an indication that a segment has been lost. Thus, after the sender receives three duplicate ACKs, it retransmits what appears to be the missing segment, without waiting for its own retransmission timer to expire. After the fast retransmit algorithm sends what appears to be the missing segment, the fast recovery algorithm governs the transmission of new data, possibly at a reduced rate, until a non-duplicate ACK arrives.

For the past twenty years, TCP/IP has been implemented as a software suite, typically as a part of computer operating systems. In software implementations, the receiver and transmitter processes carried out by each of the peers (such as sending data, receiving ACKs and updating window sizes) are serialized, due to the nature of program execution in general-purpose microprocessors. This serialization introduces a certain delay in transmission, since ACKs and window size changes must be processed before the transmitter can decide how much more data it should send. As long as network speed was the main factor limiting transmission rates, the TCP/IP processing delay was insignificant. With network speeds now increasing to the Gbps range, however, this is no longer the case, and faster TCP/IP processing is required.

In an attempt to clear the TCP/IP bottleneck, hardware-based protocol processors have been developed. Yet the speed with which these processors can transmit TCP segments is still held back by the serial nature of existing methods for synchronizing data transmission, ACK reception and window size adjustment. There is thus a need for a TCP/IP transmitter that is capable of transmitting at full wire speed without serialization delay for as long as it has data to transmit, while still maintaining the desirable reliability, congestion avoidance and retransmission/recovery features of the classic software-implemented protocol.

SUMMARY OF THE INVENTION

It is an object of some aspects of the present invention to provide an efficient architecture for high-speed data transceivers implementing reliable transport protocols, particularly for TCP/IP.

In preferred embodiments of the present invention, a data transceiver comprises a protocol accelerator for use in processing TCP/IP traffic. The accelerator comprises a transmitter and a receiver, mutually coupled by a synchronization interface. The transmitter sends data over the network to a remote peer continuously, beginning from a starting segment and continuing up to a final segment at the end of its current transmission window. The peer returns ACKs and window size advertisements to the receiver, in accordance with the protocol. The receiver passes the peer responses to the synchronization interface, which processes the responses to determine changes in the window size, as well as updating the starting segment.

Thus, there is no need to interrupt transmitter operation to deal with ACKs or window size advertisements, since these operations are carried out in parallel by the synchronization interface. As long as the TCP connection is operating normally, the synchronization interface passes the updated window and starting segment values to the transmitter intermittently, while the transmitter is sending data. The transmitter uses these values to slide its current transmission forward, so as to redetermine the final segment on the fly, while sending data. In this way, full-speed transmission is maintained without interruption as long as the transmitter has more data to send. When the synchronization interface determines that a segment has been lost, due to a timeout or to receiving duplicate ACKs from the peer, it signals the transmitter with the appropriate starting segment value from which it should begin retransmission.

In some preferred embodiments of the present invention, the synchronization interface passes an updated starting segment value to the transmitter only after having collecting a certain number of ACKs. Preferably, the number of ACKs to collect is determined by an aggregation window, which is signaled by the transmitter to the synchronization interface depending on the congestion state of the TCP connection. By the same token, the synchronization interface preferably signals the transmitter with changes in the advertised window size only when the window has changed by a full segment, so that the transmitter does not have to deal with byte-level changes as in implementations known in the art. These features of the present invention reduce the signaling and computational burden on the transmitter, so that its resources are freed for actual data transmission.

Although preferred embodiments are described herein with reference to TCP/IP, the principles of the present invention may similarly be applied to high-speed implementation of other reliable transport protocols.

There is therefore provided, in accordance with a preferred embodiment of the present invention, a data transceiver, including:

a transmitter, coupled to generate datagrams for transmission to a peer over a network in accordance with a reliable transport protocol, so as to transmit the datagrams substantially continuously from a starting datagram through a final datagram in a current transmission window;

a receiver, coupled to receive acknowledgments from the peer of the datagrams that have reached the peer over the network; and a synchronization interface, coupled to receive the acknowledgments from the receiver and, responsive thereto, to redetermine the starting datagram and to inform the transmitter of the redetermined starting datagram, causing the transmitter to redetermine the final datagram in the current transmission window substantially without interrupting the transmission of the datagrams.

Preferably, the synchronization interface is configurable to inform the transmitter of the redetermined starting datagram only after having received a plurality of the acknowledgments. Further preferably, the transmitter is coupled to define an aggregation window, indicating to the synchronization interface how many of the acknowledgments it must receive before informing the transmitter of the redetermined starting datagram. Most preferably, the transmitter is configured to set the aggregation window to a minimum value while the transmitter is in a start-up state, and to increase the aggregation window when the transmitter enters a normal operating state.

Additionally or alternatively, the receiver is further coupled to receive from the peer advertisements of a peer transmission window size, and to convey the advertisements to the synchronization interface, and wherein the synchronization interface is coupled to inform the transmitter of changes in the peer transmission window size, causing the transmitter to redetermine the current transmission window. Preferably, the advertisements indicate the changes in the peer transmission window size in units smaller than one of the datagrams, and the synchronization interface is configured to inform the transmitter of the changes in the peer transmission window size only when the changes are of a cumulative magnitude equal at least to one of the datagrams. Most preferably, the transmitter is configured to redetermine the current transmission window as a minimum of the peer transmission window size and a current data window size, which is determined by an amount of data waiting to be transmitted.

Preferably, the synchronization interface is configured to determine, responsive to the acknowledgments, that at least one of the datagrams was lost in the network, and to redetermine the starting datagram so as to cause the transmitter to retransmit the at least one of the datagrams. Further preferably, the synchronization interface is configured to set a timer upon receiving each of the acknowledgments, and to determine that the at least one of the datagrams was lost if the timer expires before the synchronization interface receives the next one of the acknowledgments. Most preferably, the transmitter is coupled to stop the timer after transmitting the final datagram. Additionally or alternatively, the synchronization interface is configured to determine that the at least one of the datagrams was lost when it receives multiple acknowledgments of another one of the datagrams.

There is also provided, in accordance with a preferred embodiment of the present invention, a data transceiver, including:

a transmitter, coupled to generate Transmission Control Protocol/Internet Protocol (TCP/IP) segments for transmission to a peer over a network, so as to transmit the segments substantially continuously from a starting segment through a final segment in a current transmission window;

a receiver, coupled to receive acknowledgments from the peer of the segments that have reached the peer over the network; and a synchronization interface, coupled to receive the acknowledgments from the receiver and, responsive thereto, to redetermine the starting segment and, after having received an assigned number of the acknowledgments, to inform the transmitter of the redetermined starting segment, causing the transmitter to redetermine the final segment substantially without interrupting the transmission of the segments.

Preferably, the transmitter is coupled to define an aggregation window, indicating to the synchronization interface how many of the acknowledgments it must receive before informing the transmitter of the redetermined starting segment. Most preferably, the transmitter is configured to set the aggregation window so that the assigned number of the acknowledgments is one while the transmitter is in a slow start state, and to increase the aggregation window so that the assigned number of the acknowledgments is two or more when the transmitter enters a congestion avoidance state.

Preferably, the receiver is further coupled to receive from the peer advertisements of a peer transmission window size, and to convey the advertisements to the synchronization interface, and wherein the synchronization interface is coupled to inform the transmitter of changes in the peer transmission window size when the changes are of a cumulative magnitude equal at least to one of the segments, causing the transmitter to redetermine the current transmission window.

There is additionally provided, in accordance with a preferred embodiment of the present invention, a method for transmitting data, including:

generating a sequence of datagrams for transmission in accordance with a reliable transport protocol;

transmitting the datagrams to a peer over a network substantially continuously from a starting datagram through a final datagram in a current transmission window;

receiving acknowledgments from the peer of the datagrams that have reached the peer over the network;

responsive to the acknowledgments, redetermining the starting datagram while transmitting the datagrams; and responsive to the redetermined starting datagram, redetermining the final datagram in the current transmission window substantially without interrupting transmission of the datagrams.

There is further provided, in accordance with a preferred embodiment of the present invention, a method for transmitting data, including:

generating a sequence of Transmission Control Protocol/Internet Protocol (TCP/IP) segments;

transmitting the segments to a peer over a network substantially continuously from a starting segment through a final segment in a current transmission window;

receiving acknowledgments from the peer of the segments that have reached the peer over the network;

responsive to the acknowledgments, redetermining the starting segment while transmitting the segments; and redetermining the final segment responsive to the redetermined starting segment only after having received an assigned number of the acknowledgments and substantially without interrupting transmission of the segments.

The present invention will be more fully understood from the following detailed description of the preferred embodiments thereof, taken together with the drawings in which:

DETAILED DESCRIPTION OF PREFERRED EMBODIMENTS

Figure 1:
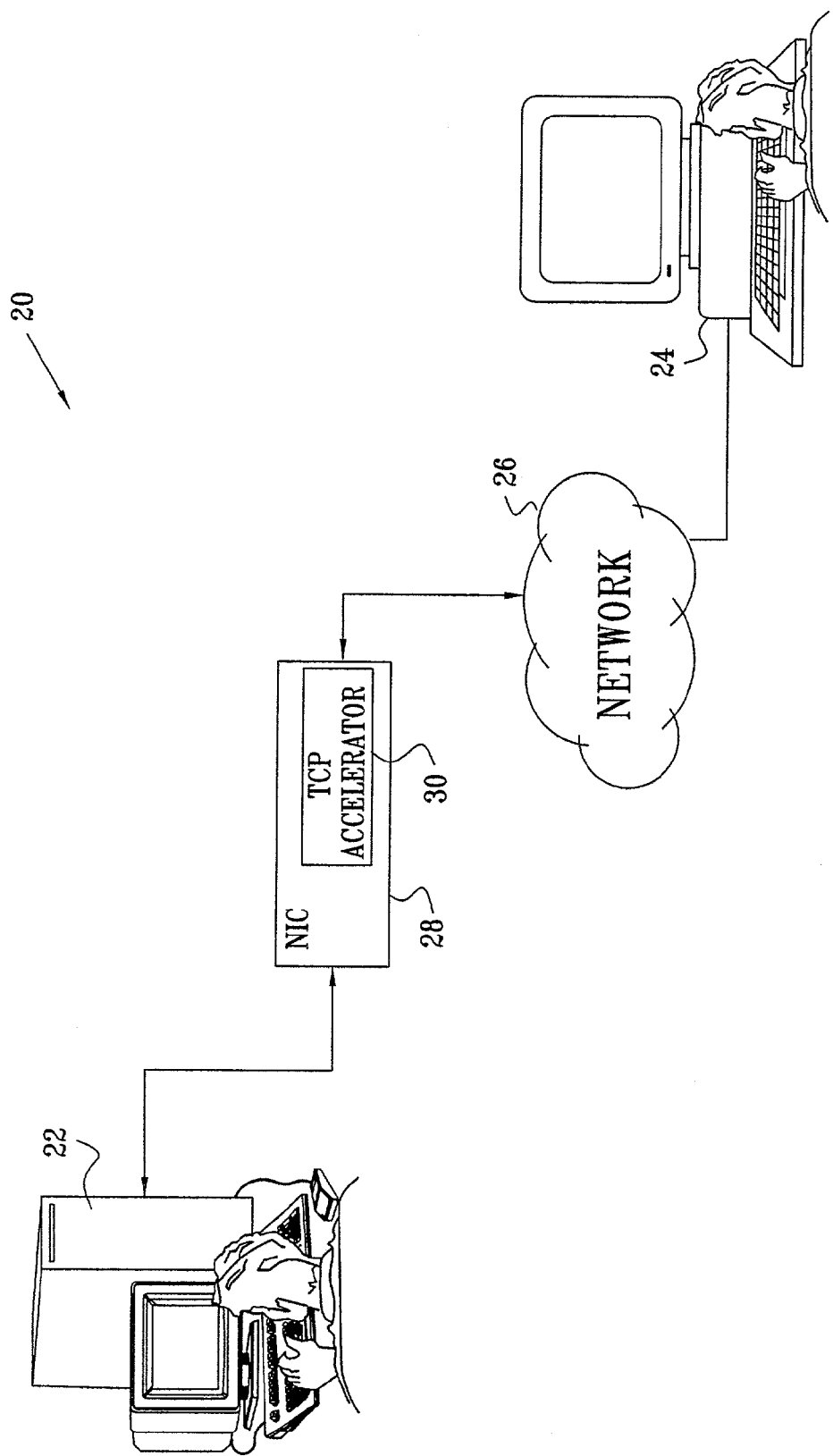
FIG. 1 is a schematic, partly pictorial diagram showing a network communication system with protocol acceleration, in accordance with a preferred embodiment of the present invention.

FIG. 1 is a schematic, partly pictorial illustration of a network communication system 20, in accordance with a preferred embodiment of the present invention. A transmitting host computer 22 sends data to a peer host computer 24 via a network 26, using TCP/IP. Host 22 is coupled to network 26 by a network interface card (NIC) 28, which serves as a data transceiver. NIC 28 includes a TCP hardware accelerator 30, which relieves host 22 of the burden of TCP/IP processing in software. The design and operation of TCP accelerator 30 are described in detail hereinbelow. In other respects, NIC 28 operates in a manner substantially similar to network interface adapters known in the art. Preferably, accelerator 30 transmits and receives data segments in a manner that is fully compatible with TCP/IP specifications, as described in the RFCs cited in the Background of the Invention. As a result, although it is desirable that host 24 also have a similar TCP accelerator, NIC 28 with accelerator 30 will still operate properly as a peer to conventional software implementations of the protocol.

Figure 2:
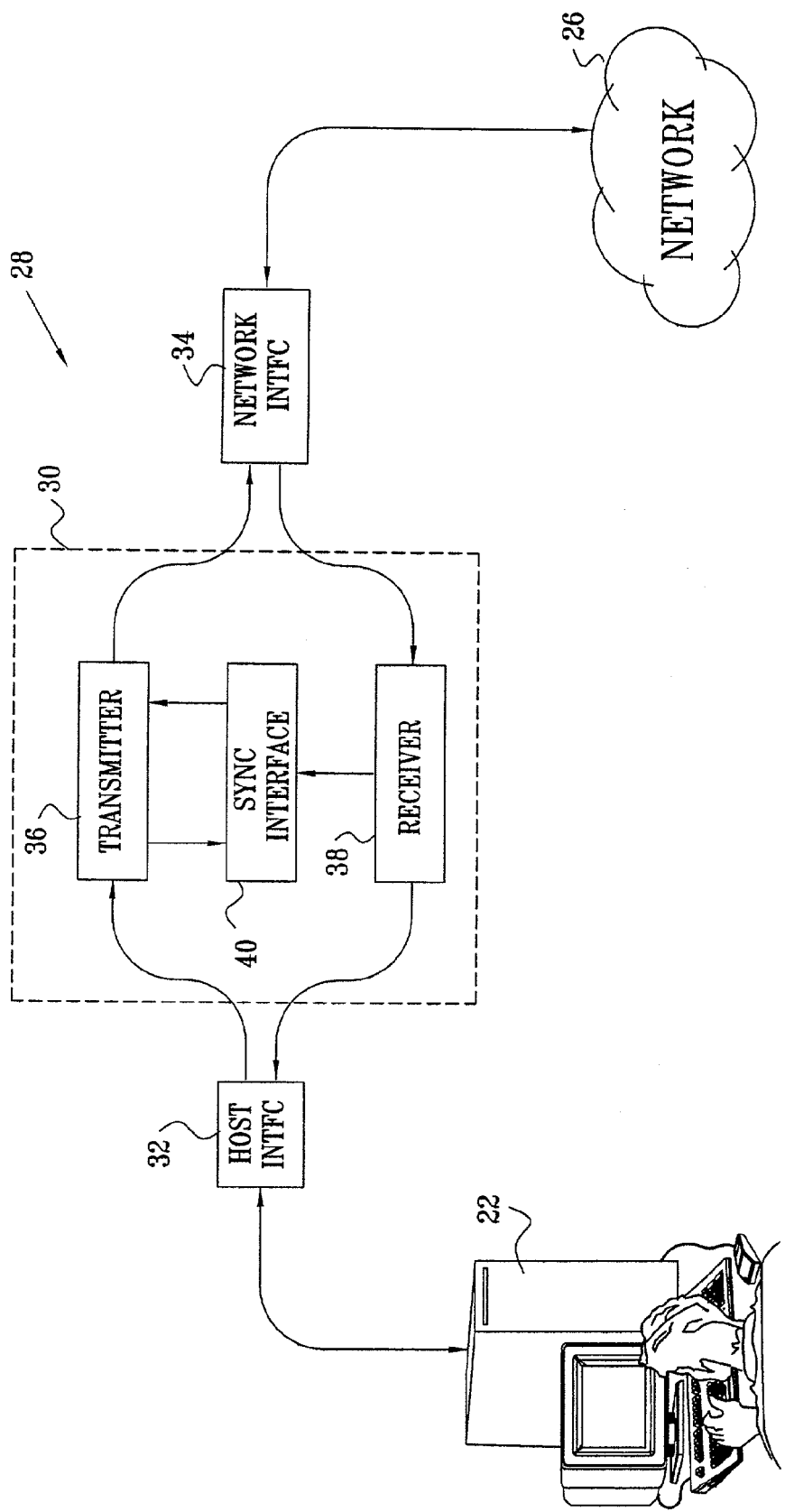
FIG. 2 is a block diagram that schematically shows details of a network interface adapter used in the system of FIG. 1, in accordance with a preferred embodiment of the present invention.

FIG. 2 is a block diagram that schematically shows details of NIC 28, in accordance with a preferred embodiment of the present invention. The NIC includes a host interface 32 and a network interface 34, which perform IP and lower-level protocol functions, as are known in the art. TCP accelerator 30 comprises a transmitter 36 and a receiver 38, mutually coupled by a synchronization interface 40. Preferably, accelerator 30 is implemented in hardware, most preferably on a single custom or semi-custom integrated circuit chip, in which the functions of the transmitter, receiver and synchronization interface are carried out in parallel. Alternatively, some of these functions may be carried out in software, using an embedded microprocessor, for example.

Transmitter 36 generates and sends TCP segments to peer host 24 (referred to hereinafter simply as peer 24), beginning from a starting segment and continuing until it has sent a final segment at the end of its current transmission window. The final segment is continually recalculated by transmitter 36 on the fly, as described hereinbelow, for as long as the network congestion state permits, and as long as host 22 has further data to transmit. In response to the TCP segments sent from transmitter 36, peer 24 returns ACKs, and periodically advertises its updated window size, in accordance with TCP specifications. Receiver 38 passes the ACKs and window advertisements to synchronization interface 40 for processing. Preferably, the receiver also acknowledges incoming TCP data segments that it receives from peer 24 and passes the received data on to host 22.

Synchronization interface 40 and transmitter 36 use the following parameters and signals in controlling the starting and final segments used by the transmitter:

A "transmission window" parameter is determined by the synchronization interface based on the window advertisements received from the peer. It indicates the allowed window based on conditions of the TCP connection. (This parameter is thus equivalent to the "rwnd" parameter described in the above-mentioned RFC 2581.) The synchronization interface updates the value of the transmission window from time to time, as required by accepted TCP specifications, and signals the transmitter intermittently when the window size has changed.

A "current transmit data window" parameter is determined by the transmitter, and indicates the desired transmission window depending on the amount of data waiting to be transferred from host 22.

The "starting segment" is the first segment in the current transmission window, and is the position from which the transmitter will begin the next data transmission to the peer. The synchronization interface determines the starting segment value continually, depending on the flow of ACKs from the peer, and signals the transmitter intermittently with the updated value. The starting segment value is also used to control retransmission when the synchronization interface determines that a segment has been lost.

The "final segment" is determined by the transmitter, based on the current starting segment value and the current transmission window value, which is the minimum of the transmission window (determined by the synchronization interface) and the current data window. Whenever the synchronization interface signals the transmitter that the starting segment or the transmission window size has changed, the transmitter slides the current transmission window forward and recalculates the final segment value accordingly on the fly, without interrupting transmission.

An "aggregation window" is determined by the transmitter, which signals the aggregation window size to the synchronization interface. The size of the aggregation window indicates the number of ACKs that the synchronization interface will receive before signaling the transmitter with a new starting segment value. Preferably, the aggregation window size is set to zero in slow start and other transient states of the transmitter, and is increased when the transmitter enters the normal congestion avoidance state.

The use of these parameters and signals is described further with reference to the figures that follow.

Figure 3:
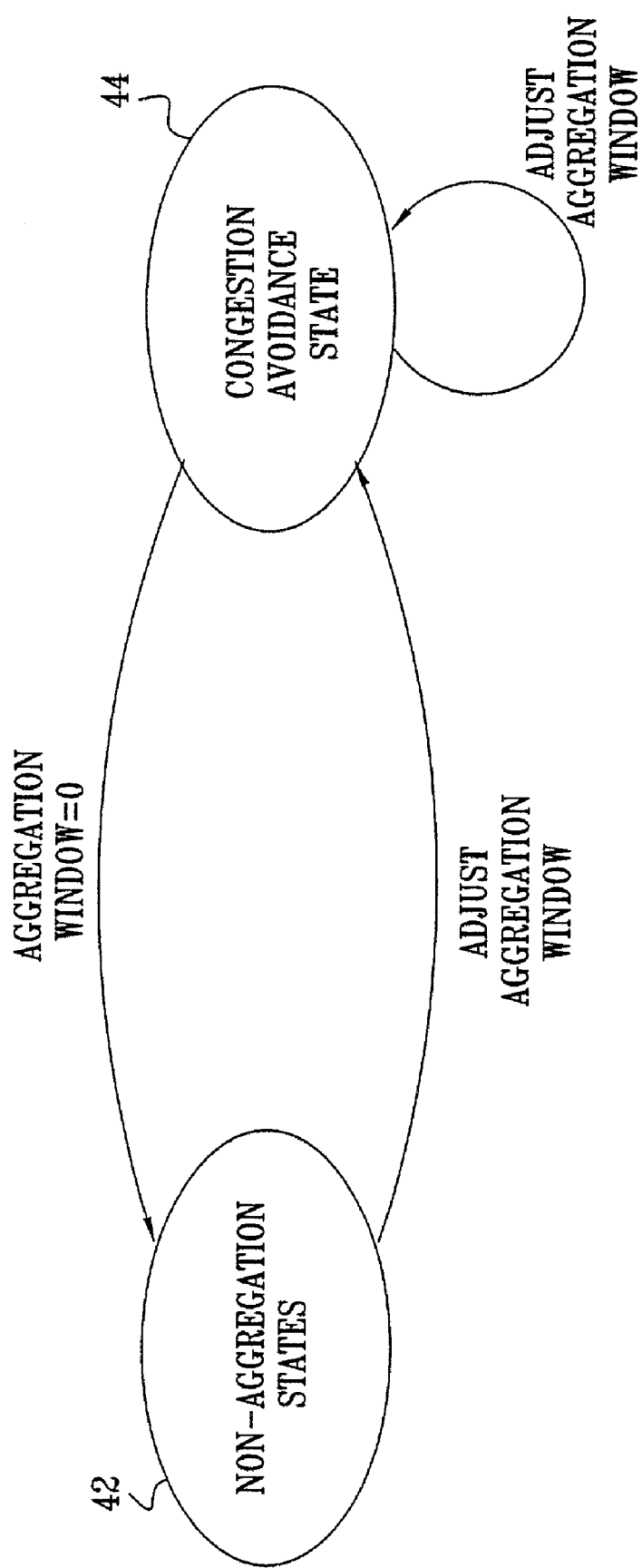
FIG. 3 is a state diagram that schematically illustrates a method for adjusting an acknowledgment aggregation window, in accordance with a preferred embodiment of the present invention.

FIG. 3 is a state diagram showing a method for adjustment of the aggregation window by transmitter 36, in accordance with a preferred embodiment of the present invention. The transmitter begins operation in slow start state, as specified in the above-mentioned RFC 2581, which is one of a set of non-aggregation states 42. In this state, the transmitter signals synchronization interface 40 that the aggregation window size should be zero, forcing the synchronization interface to disable ACK aggregation and notify the transmitter every time an ACK is received. In this state the transmitter gradually increases its current data window, in accordance with the slow start algorithm, until the window is large enough for the transmitter to enter a congestion avoidance state 44.

When the transmitter enters the congestion avoidance state, it signals the synchronization interface to adjust the aggregation window size. Optionally, while operating in the congestion avoidance state, the transmitter may signal the synchronization interface to increase or decrease the aggregation window size, depending on conditions such as the current transmission window value and other parameters. A change in the aggregation window value is typically invoked by the transmitter under a variety of different conditions, such as when the retransmission timeout (RTO) or round-trip delay (RTD) value changes, when silly window syndrome is detected, when packet retransmission is required, when the congestion state changes, or when the last packet is sent.

Upon reaching the final segment to transmit, or under certain other conditions that require it to terminate normal congestion avoidance, transmitter 36 returns to non-aggregation states 42. The transition to a non-aggregation state may occur, for example, when the transmitter returns to the slow start state due to a reduction in the current transmission window size or when it must take measures to avoid the silly window syndrome, as described in the above-mentioned RFC 813. Under these conditions, the transmitter signals the synchronization interface to close the aggregation window back down to zero.

Figure 4:
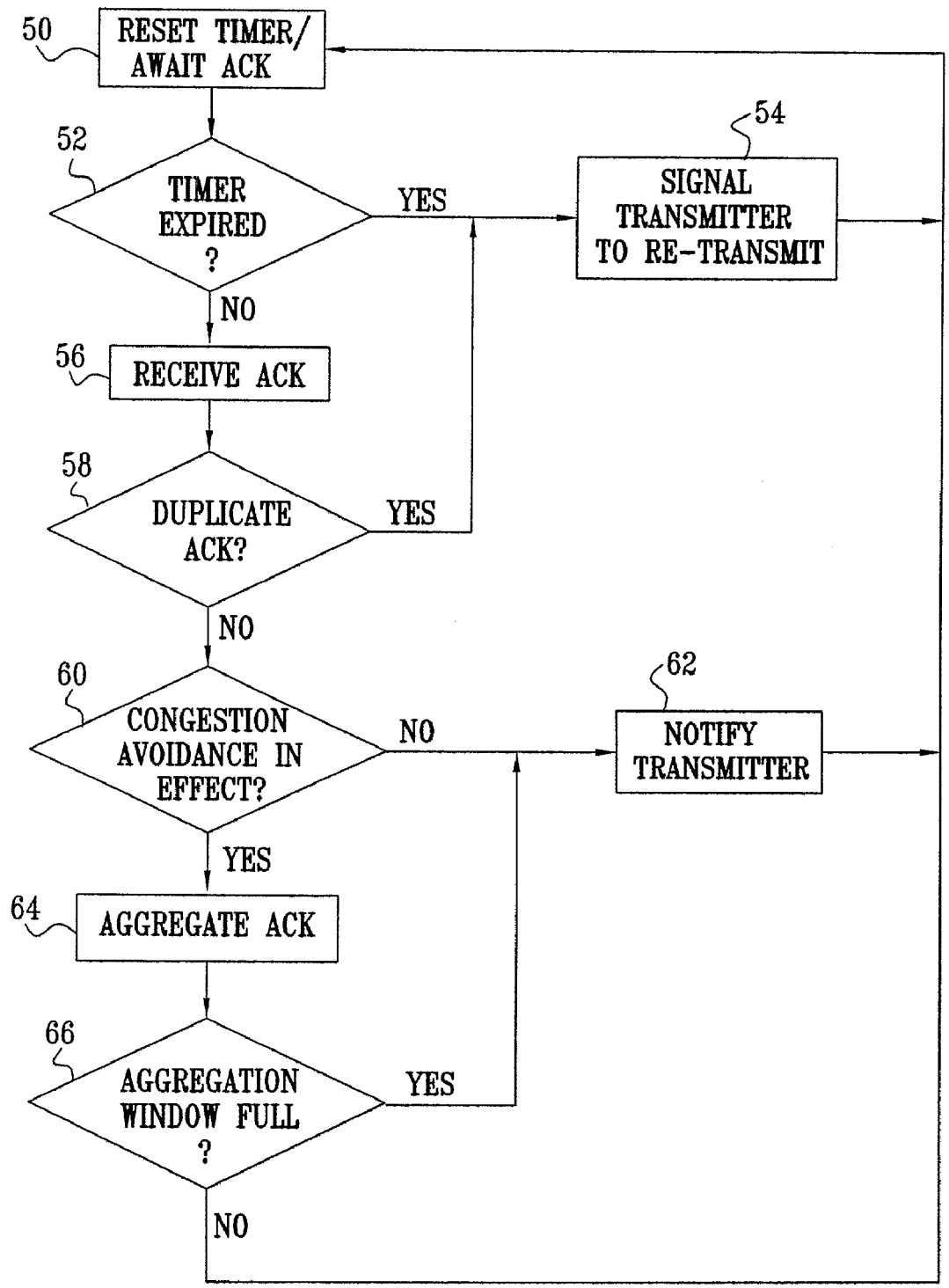
FIG. 4 is a flow chart that schematically illustrates a method for processing acknowledgments, in accordance with a preferred embodiment of the present invention.

FIG. 4 is a flow chart that schematically illustrates the operation of synchronization interface 40, in accordance with a preferred embodiment of the present invention. After each successive ACK that the synchronization interface receives from receiver 38, it resets a retransmission timer, and awaits the next ACK, at a reset step 50. If the timer expires before the next ACK is received, at an expiration step 52, it is interpreted by the synchronization interface as an indication that a fragment has been lost. In this case, the synchronization interface signals transmitter 36 to retransmit the lost segment, at a retransmission step 54, while passing the value of the starting segment from which retransmission should begin. Under these conditions, the transmitter will continue transmitting from the indicated starting segment, up to its recalculated final segment.

When the next ACK is received, at an ACK reception step 56, the timer is reset. The synchronization interface checks to determine whether this is a duplicate ACK, at a duplication checking step 58. As specified by RFC 2581, if three consecutive duplicate ACKs are received on a segment earlier than the last one transmitted, the synchronization interface determines that a segment has been lost. In this case, too, the synchronization interface signals the transmitter at step 54 to adjust its starting segment value back to the lost segment and continue transmission. Under these conditions, the aggregation window size is reset to zero (no aggregation), in order to prevent a possible deadlock of the transmitter.

When the ACK is not a duplicate, the synchronization interface checks whether the aggregation window is set to a non-zero value, at a state checking step 60. As described above, the value of the aggregation window is preferably greater than zero when the transmitter is in congestion avoidance state 44. Alternatively or additionally, the size of the aggregation window may be determined by other criteria. If the transmitter is in one of non-aggregation states 42, the synchronization interface immediately notifies the transmitter of the ACK, at a transmitter notification step 62. Otherwise, the synchronization interface increments its own count of ACKs that have been received, at an aggregation step 64. It then checks to determine whether the number of aggregated ACKs is equal to the current window size, at a window checking step 66. If so, the synchronization interface recalculates the starting segment value, and notifies the transmitter of the new value at step 62. If the window is not yet full, the synchronization interface simply awaits the next ACK at step 50, and the entire process repeats.

Figure 5:
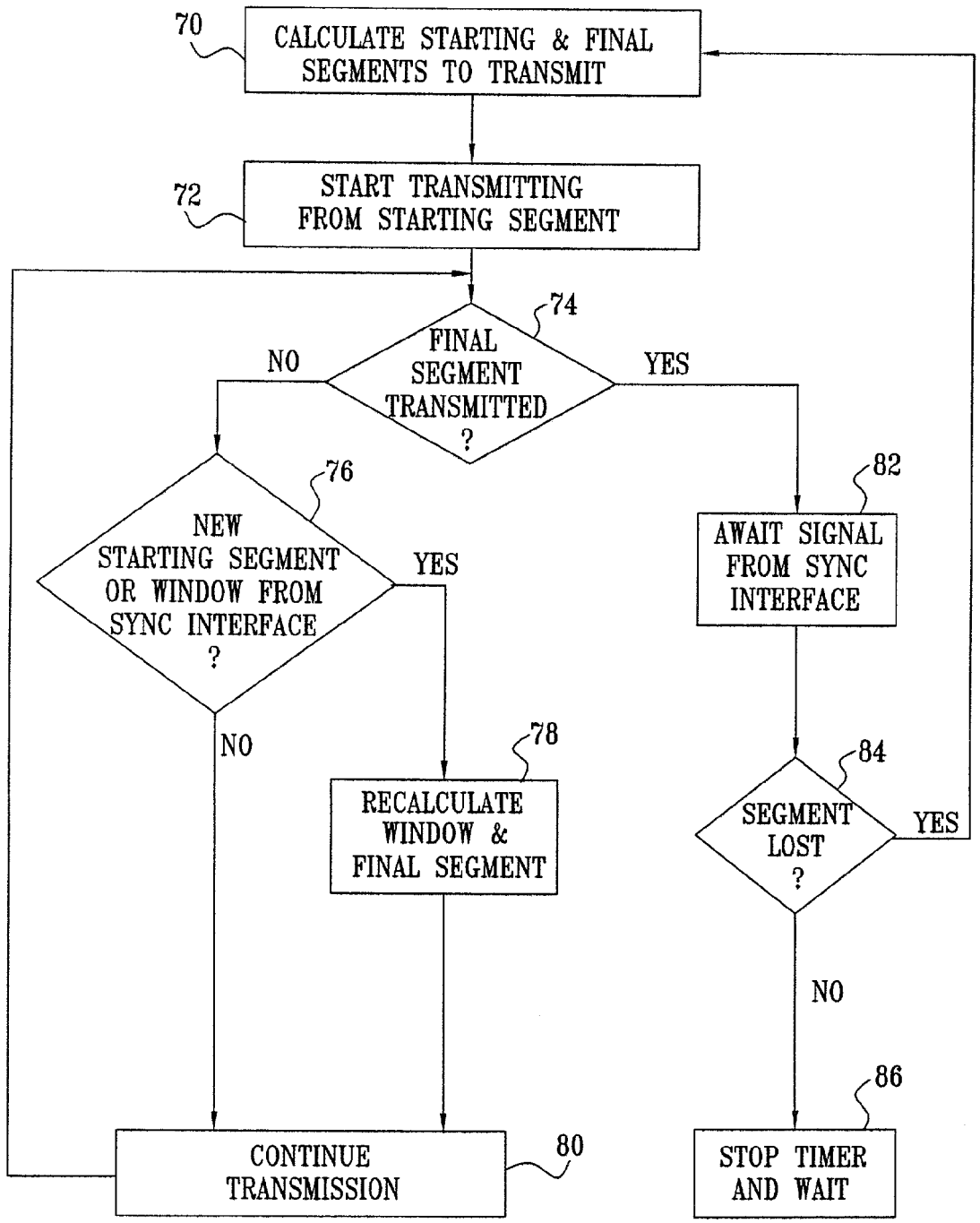
FIG. 5 is a flow chart that schematically illustrates a method for transmitting data segments, in accordance with a preferred embodiment of the present invention.

FIG. 5 is a flow chart that schematically illustrates the operation of transmitter 36, in accordance with a preferred embodiment of the present invention. At the beginning of transmission, the transmitter receives the starting segment and transmission window values from synchronization interface 40. It uses this information to determine the current transmission window value and, hence, the final segment to transmit, at a starting calculation step 70. The transmitter then starts transmitting TCP segments to peer 24, beginning from the starting segment, at a transmission initiation step 72. Transmission typically begins in the slow start state, followed by transition to the congestion avoidance state as specified by RFC 2581.

In congestion avoidance state, the transmitter sends TCP segments from host 22 substantially without interruption until it reaches the final segment, at a final transmission step 74. While sending segments, the transmitter typically receives signals from the synchronization interface, updating the starting segment value or the transmission window value, at an update step 76. When such signals arrive, the transmitter adjusts the current transmission window value, if necessary, and recalculates the final segment value, at a recalculation step 78. This recalculation is preferably performed on the fly, while the transmitter continues to send TCP segments to peer 24, at a continued transmission step 80. In this way, the final segment value is continually pushed back, so that the transmitter will not reach the actual final segment at step 74 until it has exhausted the data provided by host 22 for transmission.

After transmitting the final segment at step 74, transmitter 36 awaits the signal from synchronization interface 40 indicating that the final segment was acknowledged by the receiver, at a final signaling step 82. This signal will cause the synchronization interface to increment the starting segment to a value greater than the final segment value held by the transmitter, and to signal the transmitter accordingly. If a segment has been lost, of course, the synchronization interface will not receive the final ACK. In this case, the synchronization interface signals the transmitter that the segment has been lost, at a lost segment step 84, and transmission resumes from the starting segment indicated by the synchronization interface, as described above.

When the last segment has been received and acknowledged, so that no further ACKs are to be expected, transmitter 36 signals synchronization interface 40 to stop its retransmission timer, at a timer stopping step 86. Otherwise, the timer will expire (at step 52, FIG. 4), causing the synchronization interface to signal the transmitter to retransmit data. To avoid this situation, the timer is stopped after the last ACK, and is subsequently restarted the next time the transmitter begins sending data.

Although preferred embodiments are described herein with reference to TCP/IP, it will be apparent to those skilled in the art that system 20, and specifically NIC 28, can be adapted to support other reliable transport protocols. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A data transceiver, comprising:
   a transmitter, coupled to generate datagrams for transmission to a peer over a network in accordance with a reliable transport protocol, so as to transmit the datagrams substantially continuously from a starting datagram through a final datagram in a current transmission window;
   a receiver, coupled to receive acknowledgments from the peer of the datagrams that have reached the peer over the network; and
   a synchronization interface, coupled to receive the acknowledgments from the receiver and, responsive thereto, to redetermine the starting datagram and to inform the transmitter of the redetermined starting datagram, causing the transmitter to redetermine the final datagram in the current transmission window substantially without interrupting the transmission of the datagrams.

2. A transceiver according to claim 1, wherein the synchronization interface is configurable to inform the transmitter of the redetermined starting datagram only after having received a plurality of the acknowledgments.

3. A transceiver according to claim 2, wherein the transmitter is coupled to define an aggregation window, indicating to the synchronization interface how many of the acknowledgments it must receive before informing the transmitter of the redetermined starting datagram.

4. A transceiver according to claim 3, wherein the transmitter is configured to set the aggregation window to a minimum value while the transmitter is in a start-up state, and to increase the aggregation window when the transmitter enters a normal operating state.

5. A transceiver according to claim 1, wherein the receiver is further coupled to receive from the peer advertisements of a peer transmission window size, and to convey the advertisements to the synchronization interface, and wherein the synchronization interface is coupled to inform the transmitter of changes in the peer transmission window size, causing the transmitter to redetermine the current transmission window.

6. A transceiver according to claim 5, wherein the advertisements indicate the changes in the peer transmission window size in units smaller than one of the datagrams, and wherein the synchronization interface is configured to inform the transmitter of the changes in the peer transmission window size only when the changes are of a cumulative magnitude equal at least to one of the datagrams.

7. A transceiver according to claim 5, wherein the transmitter is configured to redetermine the current transmission window as a minimum of the peer transmission window size and a current data window size, which is determined by an amount of data waiting to be transmitted.

8. A transceiver according to claim 1, wherein the synchronization interface is configured to determine, responsive to the acknowledgments, that at least one of the datagrams was lost in the network, and to redetermine the starting datagram so as to cause the transmitter to retransmit the at least one of the datagrams.

9. A transceiver according to claim 8, wherein the synchronization interface is configured to set a timer upon receiving each of the acknowledgments, and to determine that the at least one of the datagrams was lost if the timer expires before the synchronization interface receives the next one of the acknowledgments.

10. A transceiver according to claim 9, wherein the transmitter is coupled to stop the timer after transmitting the final datagram.

11. A transceiver according to claim 8, wherein the synchronization interface is configured to determine that the at least one of the datagrams was lost when it receives multiple acknowledgments of another one of the datagrams.

12. A transceiver according to claim 1, wherein the reliable transport protocol comprises Transmission Control Protocol/Internet Protocol (TCP/IP), and wherein the datagrams comprise TCP segments.

13. A data transceiver, comprising:
a transmitter, coupled to generate Transmission Control Protocol/Internet Protocol (TCP/IP) segments for transmission to a peer over a network, so as to transmit the segments substantially continuously from a starting segment through a final segment in a current transmission window;
a receiver, coupled to receive acknowledgments from the peer of the segments that have reached the peer over the network; and
a synchronization interface, coupled to receive the acknowledgments from the receiver and, responsive thereto, to redetermine the starting segment and, after having received an assigned number of the acknowledgments, to inform the transmitter of the redetermined starting segment, causing the transmitter to redetermine the final segment substantially without interrupting the transmission of the segments.

14. A transceiver according to claim 13, wherein the transmitter is coupled to define an aggregation window, indicating to the synchronization interface how many of the acknowledgments it must receive before informing the transmitter of the redetermined starting segment.

15. A transceiver according to claim 14, wherein the transmitter is configured to set the aggregation window so that the assigned number of the acknowledgments is one while the transmitter is in a slow start state, and to increase the aggregation window so that the assigned number of the acknowledgments is two or more when the transmitter enters a congestion avoidance state.

16. A transceiver according to claim 13, wherein the receiver is further coupled to receive from the peer advertisements of a peer transmission window size, and to convey the advertisements to the synchronization interface, and wherein the synchronization interface is coupled to inform the transmitter of changes in the peer transmission window size when the changes are of a cumulative magnitude equal at least to one of the segments, causing the transmitter to redetermine the current transmission window.

17. A transceiver according to claim 13, wherein the synchronization interface is configured to determine, responsive to the acknowledgments, that at least one of the segments was lost in the network, and to redetermine the starting segment so as to cause the transmitter to retransmit the at least one of the segments.

18. A method for transmitting data, comprising:
generating a sequence of datagrams for transmission in accordance with a reliable transport protocol;
transmitting the datagrams to a peer over a network substantially continuously from a starting datagram through a final datagram in a current transmission window;
receiving acknowledgments from the peer of the datagrams that have reached the peer over the network;
responsive to the acknowledgments, redetermining the starting datagram while transmitting the datagrams; and
responsive to the redetermined starting datagram, redetermining the final datagram in the current transmission window substantially without interrupting transmission of the datagrams.

19. A method according to claim 18, wherein redetermining the starting datagram comprises informing a transmitter of the datagrams of the redetermined starting datagram only after having received a plurality of the acknowledgments.

20. A method according to claim 19, wherein redetermining the starting datagram comprises defining a variable aggregation window, indicating how many of the acknowledgments must be received before informing the transmitter of the redetermined starting datagram.

21. A method according to claim 20, wherein defining the variable aggregation window comprises setting the aggregation window to a minimum value while the transmitter is in a start-up state, and increasing the aggregation window when the transmitter enters a normal operating state.

22. A method according to claim 18, and comprising receiving from the peer advertisements of a peer transmission window size, and responsive to the advertisements, informing a transmitter of the datagrams of changes in the peer transmission window size, causing the transmitter to redetermine the current transmission window substantially without interrupting transmission of the datagrams.

23. A method according to claim 22, wherein the advertisements indicate the changes in the peer transmission window size in units smaller than one of the datagrams, and wherein informing the transmitter comprises passing the changes in the peer transmission window size to the transmitter only when the changes are of a cumulative magnitude equal at least to one of the datagrams.

24. A method according to claim 22, wherein redetermining the final datagram comprises computing the current transmission window as a minimum of the peer transmission window size and a current data window size, which is determined by an amount of the data waiting to be transmitted.

25. A method according to claim 18, and comprising determining, responsive to the acknowledgments, that at least one of the datagrams was lost in the network, wherein redetermining the starting datagram comprises invoking retransmission of the at least one of the datagrams.

26. A method according to claim 25, wherein determining that the at least one of the datagrams was lost comprises setting a timer upon receiving each of the acknowledgments, and concluding that the at least one of the datagrams was lost if the timer expires before the next one of the acknowledgments is received.

27. A method according to claim 26, wherein a transmitter of the datagrams is coupled to stop the timer after transmitting the final datagram.

28. A method according to claim 25, wherein determining that the at least one of the datagrams was lost comprises receiving multiple acknowledgments of another one of the datagrams, and determining that the at least one of the datagrams was lost based on the multiple acknowledgments.

29. A method according to claim 18, wherein the reliable transport protocol comprises Transmission Control Protocol/Internet Protocol (TCP/IP), and wherein the datagrams comprise TCP segments.

30. A method for transmitting data, comprising:
generating a sequence of Transmission Control Protocol/Internet Protocol (TCP/IP) segments;
transmitting the segments to a peer over a network substantially continuously from a starting segment through a final segment in a current transmission window;
receiving acknowledgments from the peer of the segments that have reached the peer over the network;
responsive to the acknowledgments, redetermining the starting segment while transmitting the segments; and
redetermining the final segment responsive to the redetermined starting segment only after having received an assigned number of the acknowledgments and substantially without interrupting transmission of the segments.

31. A method according to claim 30, wherein redetermining the final segment comprises defining a variable aggregation window, indicating how many of the acknowledgments must be received before redetermining the final segment starting segment.

32. A method according to claim 31, wherein defining the aggregation window comprises setting the aggregation window so that the assigned number of the acknowledgments is one while transmitting the datagrams in a slow start state, and the aggregation window is enlarged so that the assigned number of the acknowledgments is two or more when transmitting in a congestion avoidance state.

33. A method according to claim 30, and comprising receiving from the peer advertisements of a peer transmission window size, and recalculating the current transmission window responsive to the peer advertisements, substantially without interrupting the transmission of the segments, only when a cumulative change in the peer transmission window size.

34. A method according to claim 30, and comprising determining, responsive to the acknowledgments, that at least one of the segments was lost in the network, wherein redetermining the starting segment comprises setting the starting segment so as to cause retransmission of the at least one of the segments.

* * * * *